United States Patent
Lee et al.

(10) Patent No.: US 9,692,159 B2
(45) Date of Patent: Jun. 27, 2017

(54) ELECTRONIC DEVICE CONNECTABLE TO EXTERNAL DEVICE AND METHOD FOR CONNECTING THE SAME

(71) Applicant: Samsung Electronics Co., Ltd., Suwon-si, Gyeonggi-do (KR)

(72) Inventors: Kwan Ho Lee, Seoul (KR); Yong Sang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 14/699,466

(22) Filed: Apr. 29, 2015

(65) Prior Publication Data

US 2015/0318628 A1    Nov. 5, 2015

(30) Foreign Application Priority Data

Apr. 30, 2014  (KR) .................. 10-2014-0052969

(51) Int. Cl.
| | |
|---|---|
| *H01R 25/00* | (2006.01) |
| *H01R 12/70* | (2011.01) |
| *H01R 43/20* | (2006.01) |
| *H01R 13/42* | (2006.01) |
| *H01R 13/24* | (2006.01) |
| *H01R 13/703* | (2006.01) |
| *H04M 1/02* | (2006.01) |
| *H04M 1/725* | (2006.01) |

(52) U.S. Cl.
CPC ..... *H01R 12/7076* (2013.01); *H01R 13/2421* (2013.01); *H01R 13/42* (2013.01); *H01R 43/20* (2013.01); *H01R 13/703* (2013.01); *H04M 1/0254* (2013.01); *H04M 1/0274* (2013.01); *H04M 1/72527* (2013.01); *Y10T 29/4921* (2015.01)

(58) Field of Classification Search
CPC .... H01R 12/7076; H01R 13/22; H01R 13/42; H01R 13/703; H01R 13/2421; H01R 43/20; H04M 1/0274; H04M 1/0254; H04M 1/72527; Y10T 29/4921
USPC .......................... 439/78, 289, 700
See application file for complete search history.

(56) References Cited

U.S. PATENT DOCUMENTS

| | | |
|---|---|---|
| 5,980,266 A | 11/1999 | Hsu |
| 6,371,801 B1 | 4/2002 | Kiviniitty |
| 7,311,526 B2 | 12/2007 | Rohrbach et al. |
| 7,517,222 B2 | 4/2009 | Rohrbach et al. |
| 7,645,143 B2 | 1/2010 | Rohrbach et al. |
| 7,901,216 B2 | 3/2011 | Rohrbach et al. |
| 8,087,939 B2 | 1/2012 | Rohrbach et al. |
| 8,177,560 B2 | 5/2012 | Rohrbach et al. |
| 8,435,042 B2 | 5/2013 | Rohrbach et al. |
| 8,550,844 B2 | 10/2013 | Fujisaki |

(Continued)

FOREIGN PATENT DOCUMENTS

| | | |
|---|---|---|
| JP | 2001-127862 A | 5/2001 |
| KR | 10-2008-0010697 A | 1/2008 |

(Continued)

*Primary Examiner* — Khiem Nguyen
(74) *Attorney, Agent, or Firm* — Jefferson IP Law, LLP

(57) ABSTRACT

An electronic device connectable to an external device is provided. The electronic device includes a case part covering the electronic device, the case part having at least one hole, and a connector, at least a part of which is exposed through the hole so as to perform electrical or physical connection to the external device, wherein the exposed part may form a smooth surface with a surface of the case part.

23 Claims, 16 Drawing Sheets

(56) References Cited

U.S. PATENT DOCUMENTS

| | | |
|---|---|---|
| 8,690,582 B2 | 4/2014 | Rohrbach et al. |
| 2004/0022388 A1 | 2/2004 | Chan et al. |
| 2005/0037636 A1 | 2/2005 | Lan |
| 2007/0072443 A1 | 3/2007 | Rohrbach et al. |
| 2008/0096398 A1 | 4/2008 | Rohrbach et al. |
| 2008/0161076 A1 | 7/2008 | Min et al. |
| 2009/0181556 A1 | 7/2009 | Rohrbach et al. |
| 2010/0035441 A1 | 2/2010 | Rohrbach et al. |
| 2010/0317233 A1 | 12/2010 | Koh |
| 2011/0136351 A1 | 6/2011 | Rohrbach et al. |
| 2012/0083137 A1 | 4/2012 | Rohrbach et al. |
| 2012/0129392 A1 | 5/2012 | Fujisaki |
| 2012/0178271 A1 | 7/2012 | Rohrbach et al. |
| 2013/0065406 A1 | 3/2013 | Rohrbach et al. |
| 2014/0106585 A1 | 4/2014 | Shimizu et al. |
| 2014/0285957 A1 | 9/2014 | Rohrbach et al. |
| 2015/0011099 A1 | 1/2015 | Kim et al. |

FOREIGN PATENT DOCUMENTS

| | | |
|---|---|---|
| KR | 10-2010-0062748 A | 6/2010 |
| KR | 10-2011-0054707 A | 5/2011 |
| KR | 10-2012-0053952 A | 5/2012 |
| KR | 20-0470295 Y1 | 12/2013 |
| KR | 10-2014-0026614 A | 3/2014 |
| WO | 2009/082181 A2 | 7/2009 |

ELECTRONIC DEVICE CONNECTABLE TO EXTERNAL DEVICE AND METHOD FOR CONNECTING THE SAME

CROSS-REFERENCE TO RELATED APPLICATION

The application claims the benefit under 35 U.S.C. §119(a) of a Korean patent application filed on Apr. 30, 2014 in the Korean Intellectual Property Office and assigned Serial number 10-2014-0052969, the entire disclosure of which is hereby incorporated by reference.

TECHNICAL FIELD

The present disclosure relates to an electronic device connectable to an external device and a device connecting method.

BACKGROUND

Electronic devices such as smartphones and tablets may provide various functions such as communication, multimedia processing, and game running. Furthermore, the electronic devices may be connected to external devices (e.g., a wireless charging cover, a game pad, a keyboard, a speaker, and the like) for extending a function.

Typically, a signal connector (e.g., a micro USB) for electrical connection and a coupling connector (e.g., a docking device) for physical connection are required to connect an electronic device to an external device to extend a function, and the efficiency of device connection may thus be degraded.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device includes a case part connectable to an external device, the case part configured to cover the electronic device, the case part having at least one hole, and a connector, at least a part of which is exposed through the hole so as to perform electrical or physical connection to the external device, wherein the exposed part forms a smooth surface with a surface of the case part.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
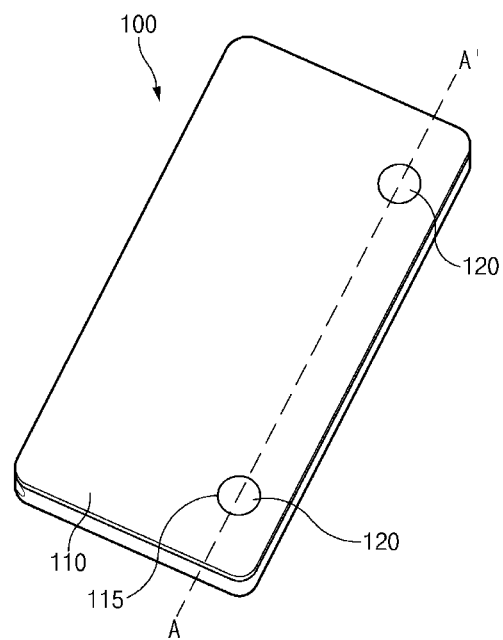
FIGS. 1A and 1B illustrate an electronic device including a connector for connecting an external device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising" used herein indicates disclosed functions, operations, or existence of elements but does not exclude other functions, operations or elements. It should be further understood that the term "include", "including", "comprise", "comprising", "have", or "having" used herein specifies the presence of stated features, numbers, operations, elements, components, or combinations thereof but does not preclude the presence or addition of one or more other features, numbers, operations, elements, components, or combinations thereof.

The meaning of the term "or" used herein includes any combination of words connected by the term "or". For example, the expression "A or B" may indicate A, B, or both A and B.

The terms such as "first", "second", and the like used herein may refer to various elements of various embodiments of the present disclosure, but do not limit the elements. For example, such terms do not limit the order and/or priority of the elements.

The terminology used herein is not for delimiting the present disclosure but for describing specific various embodiments of the present disclosure. The terms of a singular form may include plural forms unless otherwise specified.

The terms used herein, including technical or scientific terms, have the same meanings as understood by those skilled in the art unless otherwise defined herein. The commonly used terms such as those defined in a dictionary should be interpreted in the same context as in the related art and should not be interpreted in an idealized or overly formal sense unless otherwise defined explicitly.

An electronic device according to the present disclosure may be connected to an external device. For example, the electronic device may include at least one of a smartphone, a tablet personal computer (PC), a mobile phone, a video telephone, an electronic book reader, a desktop PC, a laptop PC, a netbook computer, a personal digital assistant (PDA), a portable multimedia player (PMP), an MP3 player, a mobile medical device, a camera, or a wearable device (e.g., a head-mounted-device (HMD) such as electronic glasses, an electronic apparel, an electronic bracelet, an electronic necklace, an electronic accessory, an electronic tattoo, or a smartwatch).

Hereinafter, an electronic device according to various embodiments of the present disclosure will be described with reference to the accompanying drawings. The term "user" used herein may refer to a person who uses an electronic device or may refer to a device (e.g., an artificial electronic device) that uses the electronic device.

Figure 1B:
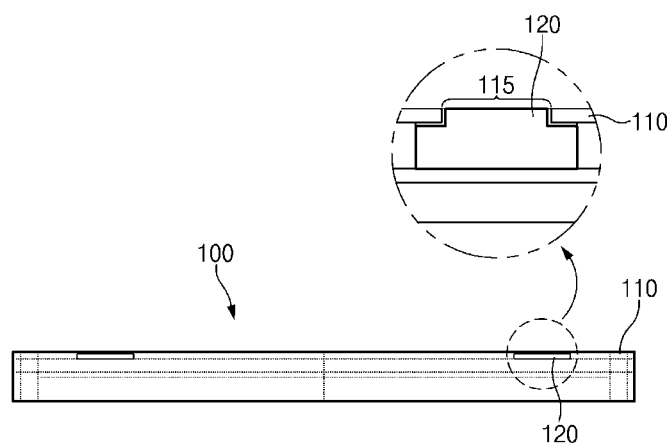

FIGS. 1A and 1B illustrate an electronic device including a connector for connecting an external device according to various embodiments of the present disclosure.

FIG. 1A is a perspective view of the electronic device including a connector for connecting an external device according to various embodiments of the present disclosure.

Referring to FIG. 1A, an electronic device 100 may include a case part 110 and a connector 120.

The case part 110 may surround at least a portion of a front part, a side part or a rear part of the electronic device 100. The case part 110 may protect a panel, a component or a circuit of the electronic device 100. The case part 110 may be formed of a non-metal material (e.g., plastic) or a metallic material. The case part 110 may be injection-molded as one piece, or at least a portion of a front part, a side part and a rear part may be individually formed and then may be combined with each other to form the case part 110.

The case part 110 may include at least one hole 115. FIG. 1A exemplarily illustrates that the hole 115 is disposed in the rear part of the electronic device 100, but the hole 115 is not limited thereto. For example, the hole 115 may also be disposed in the side part or the front part of the electronic device 100. The hole 115 may expose the connector 120 for connecting an external device (e.g., a wireless charging cover, a game pad, a keyboard, a speaker, or the like) to the electronic device 100. Furthermore, although FIG. 1A illustrates a circular shape of the hole 115, the hole 115 is not limited thereto and may be formed in various shapes such as a quadrangle or a pentagon.

The connector 120 may be fixed to one surface of a board, a bracket, a housing or a hardware component in the electronic device 100 so that at least a part of the connector 120 may be exposed through the hole 115. The connector 120 may include an elastic member (e.g., a spring), and, when an external pressure is applied to the exposed part of the connector 120 (e.g., when an external device is connected), the exposed part of the connector 120 may be moved towards the inside of the electronic device 100. Thereafter, when the pressure is released (e.g., when an external device is disconnected), the exposed part of the connector 120 may be elastically moved towards the outside of the electronic device 100.

The connector 120 may be connected to a protruding connector attached to an external device (not shown) that may be connected to the electronic device 100. The connector 120 may serve to fix an external device to the electronic device 100 or transfer electric signals between devices. Information on a structure or operation of the connector may be provided with reference to FIGS. 2 to 14.

FIG. 1B is a cross-sectional view of the electronic device taken along line A-A' of FIG. 1A according to various embodiments of the present disclosure.

Referring to FIG. 1B, the case part 110 may include at least one hole 115. The hole 115 may expose at least a part of the connector 120.

The connector 120 may be fixed to one surface of a board, a bracket, a housing or a hardware component in the electronic device 100 so that at least a part of the connector 120 may be exposed through the hole 115. In various embodiments of the present disclosure, the exposed part may form a smooth surface (or a continuous surface) with an external surface of the case part 110. For example, the exposed part may be flush with the external surface of the case part 110 or may maintain a height difference within a predetermined range (e.g., a height difference of less than about 2 mm) with respect to the external surface of the case part 110, thereby maintaining the smooth surface (or a continuous surface). In the case where a curve is formed between the connector 120 and the external surface of the case part 110, the connector 120 may maintain the smooth surface along the curve.

When an external device is connected to the electronic device 100, the exposed part of the connector 120 may be moved towards the inside of the electronic device 100. When the external device is disconnected, the exposed part may be elastically moved towards the outside of the electronic device 100. Unity of design between the connector 120 and the case part 110 may be maintained so that a user may not easily recognize existence of the connector. The user may recognize the part of the connector 120 exposed by the hole of the case part 110 as a continuous surface of the case part 110.

Figure 2:
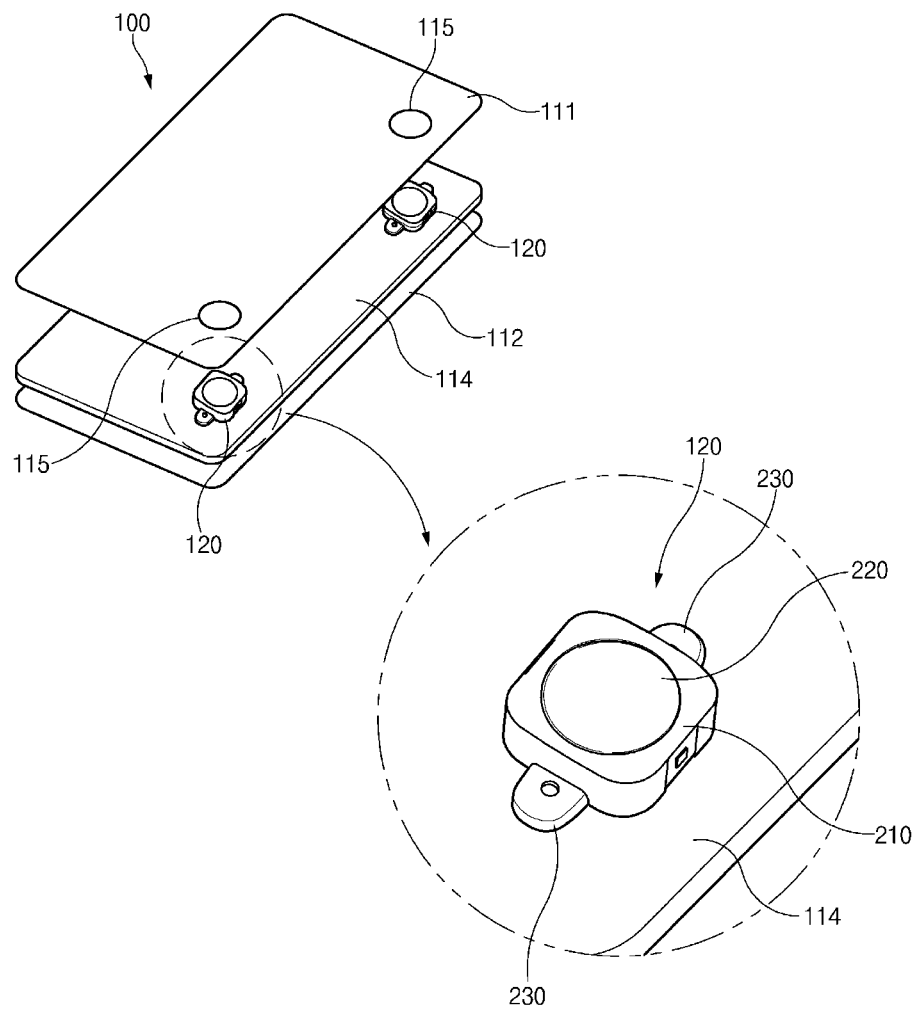
FIG. 2 is an exploded view of an electronic device including a connector according to various embodiments of the present disclosure.

FIG. 2 is an exploded view of an electronic device including a connector according to various embodiments of the present disclosure.

The case part 110 may include a rear part 111, a side part (not shown) or a front part 112. A board or bracket 114 for mounting a panel, a component or a circuit may be disposed in the case part 110. The board may mount a circuit or an element for electric operation of the electronic device 100. The bracket may correspond to a structure for fixing or protecting a pad, a board, or a component in the electronic device 100. The board or bracket 114 may fix the connector 120, and may electrically connect the connector 120 to a circuit in the electronic device 100.

The rear part 111 may include at least one hole 115. FIG. 2 illustrates that the hole 115 is disposed in the rear part 111, but the hole 115 is not limited thereto. For example, the hole 115 may also be disposed in the side part (not shown) or the front part 112. The hole 115 may expose at least a part of the connector 120 for connecting the electronic device 100 to an external device.

The connector 120 may include a body part 210, a plate 220 and a fixing part 230. The connector 120 may be fixed to the board or bracket 114 so that a least a part of the body part 210 or the plate 220 may be exposed through the hole 115.

The body part 210 may have a through-hole therein so that the plate 220 may be moved there through. The through-hole may be formed in various shapes such as a cylinder or a polygonal cylinder. The body part 210 may be connected to at least one fixing part 230 so as to be fixed to the board or bracket 114.

The plate 220 may be elastically moved in the body part 210. The plate 220 may be connected to an elastic member (e.g., a spring) in the body part 210 so as to be moved in the body part 210 by an external pressure (e.g., due to connection of an external device). When the external pressure is applied to the plate 220, the plate 220 may be moved towards a lower part of the body part 210 (in a direction from the outside to the electronic device 100), and, when the external pressure is released, the plate 220 may be moved towards an upper part of the body part 210 (in a direction from the inside of the electronic device 100 to the outside of the electronic device 100) by virtue of elastic force of the elastic member.

At least a part of the plate 220 may be exposed to the outside of the body part 210. Furthermore, the part may be exposed to the outside through the hole 115 of the case part 110. A texture or color of the exposed part may be similar to or the same as that of the case part 110 so that the exposed part is not easily differentiated from the case part 110. Furthermore, the exposed part may be flush with the external surface of the case part 110 or may have a height difference within a predetermined range (e.g., about 2 mm) with respect to the external surface of the case part 110. Therefore, the user may not easily detect existence of the connector 120, and may thus hardly feel a sense of difference in design between the connector 120 and a periphery thereof.

The fixing part 230 may be connected to the body part 210 so as to fix the body part 210 to the board or bracket 114. The fixing part 230 may be provided in plurality for the purpose of secure fixing. In various embodiments of the present disclosure, the fixing part 230 may further include a connection device (not shown) for transferring an electric signal from/to the electronic device 100. The connection device may correspond to a signal pad, a clip pad, or a connector terminal (e.g., ZIF, BTB, or the like).

Referring to FIG. 2, an elastic part and a base part may be further included in the connector 120. Information on these elements may be provided with reference to FIG. 3.

According to various embodiments of the present disclosure, the connector 120 may further include, as an additional element, a part of a board, a bracket, a housing, or a hardware component module 114 included in the case part 110.

Figure 3:
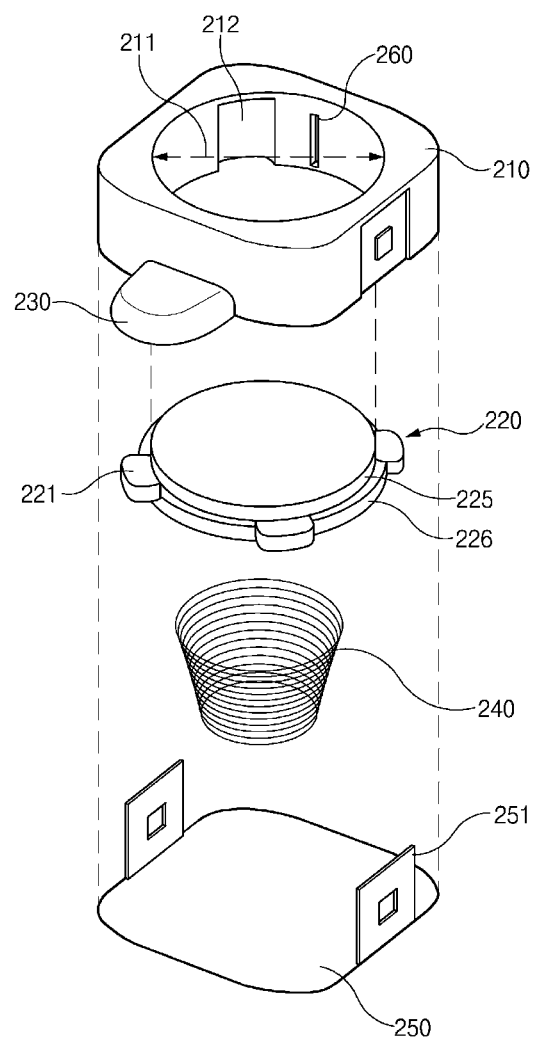
FIG. 3 is an exploded view of a connector according to various embodiments of the present disclosure.

FIG. 3 is an exploded view of a connector according to various embodiments of the present disclosure. The shape or structure of the connector illustrated in FIG. 3 is merely an example, and the connector is not limited thereto.

Referring to FIG. 3, the connector 120 may include the body part 210, the plate 220, the fixing part 230, an elastic part 240, and a base part 250.

The body part 210 may have a through-hole 211 therein so that the plate 220 may be moved there through. The through-hole 211 may be formed in various shapes such as a cylinder or a polygonal cylinder. The body part 210 may include the plate 220 or the elastic part 240 therein.

According to various embodiments of the present disclosure, the body part 210 may include a guide part 212. The guide part 212 may allow the plate 220 to move in a designated direction or along a designated route. The guide part 212 may be formed in the shape of a groove (dent type) defined in an inner wall of the body part 210 as illustrated in FIG. 3, or may be formed in the shape of a protrusion on the inner wall of the body part 210. Information on the guide part 212 may be provided with reference to FIG. 9 or 10.

The plate 220 may be connected to the elastic part 240 in the body part 210 so as to be moved in the body part 210 by an external pressure (e.g., due to connection of an external device). When the external pressure is applied to the plate 220, the plate 220 may be moved towards a lower part of the body part 210 (in a direction from the outside to the electronic device 100), and, when the external pressure is released, the plate 220 may be moved towards an upper part of the body part 210 (in a direction from the inside of the electronic device 100 to the outside of the electronic device 100) by virtue of elastic force of the elastic part 240.

According to various embodiments of the present disclosure, the plate 220 may further include a guide connection part 221. The guide connection part 221 may be formed in a shape corresponding to the guide part 212 formed in the body part 210. For example, the guide connection part 221 may be formed in the shape of a protrusion as illustrated in FIG. 3 so that the plate 220 is moved along the guide part 212 (dent type). For another example, the guide connection part 221 may be formed in the shape of a groove and may correspond to the guide part 212 formed in the shape of a protrusion. Information on the guide connection part 221 may be provided with reference to FIG. 9 or 10.

According to various embodiments of the present disclosure, the plate 220 may have a stepped stack structure (e.g., a two-stage structure). In the case where the plate 220 has a two-stage structure as illustrated in FIG. 3, the plate 220 may have a stack structure including an upper layer 225 and a lower layer 226. The upper layer 225 may be exposed to the outside through the hole 115, and the lower layer 226 may have a larger area than that of the upper layer 225 and may prevent the plate 220 from being ejected from the body part 210. A texture or color of the upper layer 225 may be similar to or the same as that of the rear part 111 of the case part 110.

The fixing part 230 may be connected to the exterior of the body part 210 so as to fix the body part 210 to the board or bracket 114. The fixing part 230 may be provided in plurality for securely fixing the body part 210. In various embodiments of the present disclosure, the fixing part 230 may further include a pad (not shown) or a connector terminal (not shown) to be electrically connected to the electronic device 100. The pad or the connector terminal may connect a contact part 260 to a circuit in the electronic device 100.

The elastic part 240 may be disposed under the plate 220 in the body part 210. When the plate 220 is moved towards the lower part of the body part 210 by an external pressure (e.g., due to connection of an external device), the elastic part 240 may be compressed. When the external pressure is released (e.g., due to disconnection of an external device), the elastic part 240 may push the plate 220 towards the upper part of the body part 210.

According to various embodiments of the present disclosure, the connector 120 may further include the base part 250. The base part 250 may be disposed under the elastic part 240 so as to support the elastic part 240. In various embodiments of the present disclosure, the base part 250 may further include a coupling part 251. The coupling part 251 may fix the base part 250 to the body part 210.

According to various embodiments of the present disclosure, the connector 120 may further include the contact part 260. The contact part 260 may be electrically connected to a protruding connector installed in an external device so as to transmit/receive an electric signal. The contact part 260 may be formed of a metallic material (e.g., copper or the like). According to various embodiments of the present disclosure, the contact part 260 may be formed as a plurality of contact pads. The plurality of contact pads may transmit/receive respective designated electric signals (e.g., signals corresponding to respective pins of a micro USB). The plurality of contact pads may be arranged on predetermined locations so as to be electrically connected to an external device. Information on the contact part 260 may be provided with reference to FIG. 11 or 12.

Figure 4:
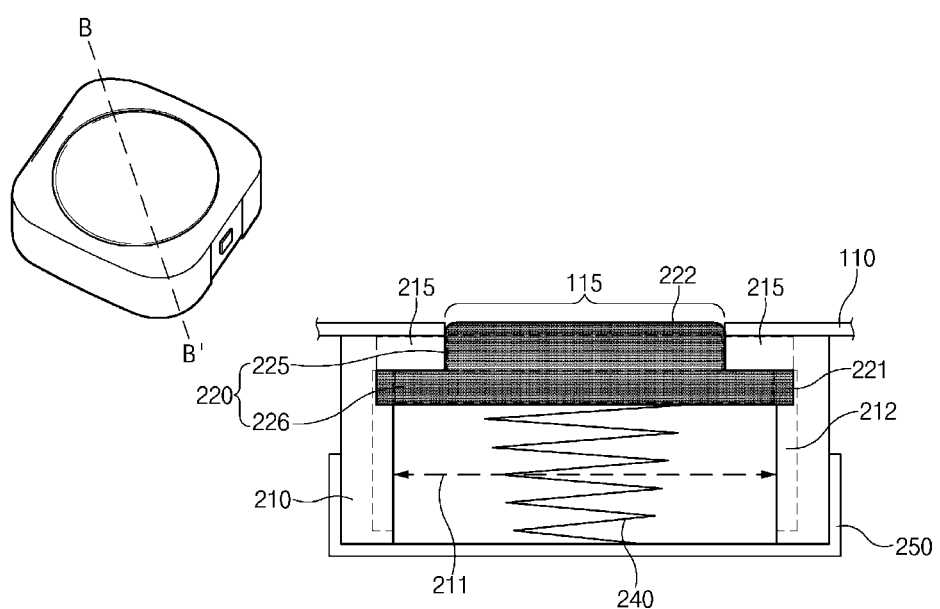
FIG. 4 is a cross-sectional view of the connector taken along line B-B' according to various embodiments of the present disclosure.

FIG. 4 is a cross-sectional view of the connector taken along line B-B' according to various embodiments of the present disclosure.

Referring to FIG. 4, the body part 210 may have the through-hole 211 through which the plate 220 may be moved. The plate 220 or the elastic part 240 may be disposed in the through-hole 211.

The body part 210 may have a barrier part 215 on a surface adjacent to one surface of the case part 110 (e.g., the rear part). The barrier part 215 may prevent the plate 220 from being discharged to the outside due to the elastic force of the elastic part 240. The barrier part 215 may reduce a top entrance of the through-hole 211 so as to prevent the plate 220 from being discharged.

The case part 110 may be disposed on the barrier part 215. The case part 110 may include the hole 115. The hole 115 may expose at least a part of a top surface 222 of the plate 220 to the outside.

The plate 220 may have a stepped stack structure (e.g., a two-stage structure). In the case where the plate 220 has a two-stage structure (the upper layer 225 and the lower layer 226), the upper layer 225 may be disposed on the lower layer 226 so that at least a part of the upper layer 225 may be exposed to the outside through the hole 115. A texture or color of the top surface 222 of the upper layer 225 may be similar to or the same as that of the case part 110. Furthermore, the top surface 222 may be flush with a surface of the case part 110 in which the hole 115 is defined or may have a height difference within a predetermined range with respect to the surface of the case part 110, while an external pressure (e.g., due to connection of an external device) is not applied to the plate 220. In this case, the top surface 222 may be hardly differentiated from the case part 110 as seen from the outside, and design uniformity may be maintained at the periphery of the hole 115.

The lower layer 226 may be disposed under the upper layer 225 so as to be supported by the elastic part 240. The lower layer 226 may have a larger area than that of the upper layer 225. The lower layer 226 may be blocked by the barrier part 215 formed at the top of the body part 210 so that the plate 220 may be prevented from being discharged to the outside.

According to various embodiments of the present disclosure, the plate 220 may further include the guide connection part 221. The guide connection part 221 may have a shape corresponding to the guide part 212 formed in the body part 210. The guide connection part 221 may be formed in the shape of a protrusion as illustrated in FIG. 4 so as to move along the guide part 212 formed in the shape of a groove. In various embodiments of the present disclosure, the guide connection part 221 may be formed in the shape of a groove and may correspond to the guide part 212 formed in the shape of a protrusion.

The elastic part 240 may be disposed between the plate 220 and the base part 250. When an external pressure (e.g., due to connection of an external device) is not applied to the elastic part 240, the elastic part 240 may push the plate 220 up to the top of the body part 210 (until the lower layer 226 is blocked by the barrier part 215 or until the guide connection part 221 is blocked by the guide part 212) by virtue of elastic force. When the external pressure (e.g., due to connection of an external device) is generated, the elastic part 240 may be compressed. In this case, the plate 220 may be moved towards the bottom of the body part 210.

The base part 250 may be disposed under the elastic part 240 so as to support the elastic part 240. In various embodiments of the present disclosure, the base part 250 may include at least one coupling part 251 in order to be fixed to the body part 210. The coupling part 251 may be fixed to an outer wall of the body part 210.

In various embodiments of the present disclosure, the base part 250 may be coupled to the body part 210 so as to be integrated therewith. For example, the body part 210 may be integrated with the base part 250, and the top of the body part 210 may be cut so that the plate 220 or the elastic part 240 is inserted into the body part 210.

Figure 5:
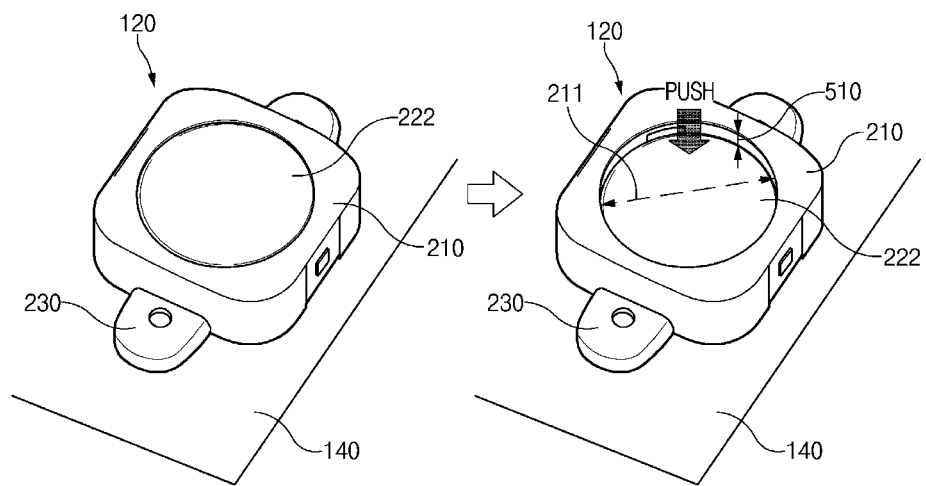
FIG. 5 is a diagram illustrating movement of a plate according to various embodiments of the present disclosure.

FIG. 5 is a diagram illustrating movement of the plate according to various embodiments of the present disclosure.

Referring to FIG. 5, if an external pressure (e.g., due to connection of an external device) is not applied to the top surface 222 of the plate 220, the top surface 222 may be pushed up to the top of the body part 210 (until it is blocked by the barrier part 215). Here, the top surface 222 may be flush with the surface of the case part 110 in which the hole 115 is defined or may have a height difference within a predetermined range with respect to the surface of the case part 110. Due to the plate 220, the user may recognize the periphery of the hole 115 of the electronic device 100 as a smooth surface, and may hardly recognize the existence of the connector 120.

When an external pressure (e.g., due to connection of an external device) is applied to the top surface 222 of the plate 220, the top surface 222 of the plate 220 may be moved towards the bottom of the body part 210 through the through-hole 211. As the plate 220 is moved, the inner wall of the body part 210 may be exposed. According to an intensity of the external pressure, a height gap 510 may be formed between the top surface 222 of the plate 220 and the top of the body part 210 (or a surface of the case part 110). The height gap 510 may be increased in proportion to the intensity of the external pressure. The height gap 510 may arrive at a maximum value when the elastic part 240 is completely compressed or the plate 220 arrives at the bottom. As the plate 220 is moved, the contact part or the guide part formed in the body part 210 may be exposed to the outside. In various embodiments of the present disclosure, when the external pressure is generated due to connection of an external device, a part of the through-hole 211 exposed due to the height gap 510 may be filled with an protruding connector connected to the external device.

When the external pressure is released, the plate 220 may return to a position flush with the case part 110 by virtue of the elastic force of the elastic part 240.

Figure 6A:
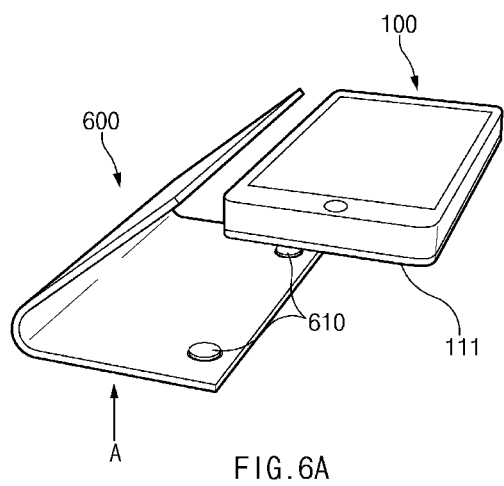
FIGS. 6A and 6B are perspective views illustrating connection between an electronic device and an external device according to various embodiments of the present disclosure.
Figure 6B:
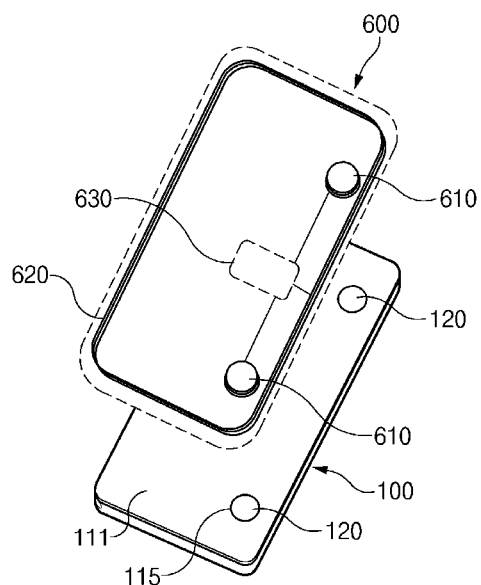

FIGS. 6A and 6B are perspective views illustrating connection between an electronic device and an external device according to various embodiments of the present disclosure.

FIG. 6A illustrates that the electronic device 100 is connected to an external device 600 through the connector 120 disposed at the rear part 111 of the case part 110.

Referring to FIG. 6A, the external device 600 may be a wireless charging cover, a game pad, a keyboard, a speaker, or a vehicle docking device connectable to the electronic device 100. The external device 600 may be physically or electrically connected to the electronic device 100 so as to exchange power signals or control signals therewith.

The external device 600 may include a protruding connector 610. The protruding connector 610 may be disposed on a location corresponding to that of the connector 120. A part of the protruding connector 610 may be inserted into the body part 210 of the connector 120. In the various embodiments of the present disclosure, the protruding connector 610 may be fixed to the connector 120. Information on connection between the protruding connector 610 and the connector 120 may be provided with reference to FIGS. 9 to 13.

FIG. 6B is a perspective view as seen from A of FIG. 6A.

Referring to FIG. 6B, the connector 120 and the protruding connector 610 may be arranged on locations corresponding to each other. In various embodiments of the present disclosure, the number of arranged connectors 120 may be larger than that of arranged protruding connectors 610. In this case, at least a portion of the connectors 120 may not be connected to the protruding connectors 610. For example, even though four connectors 120 are arranged in the electronic device 100, the external device 600 may include the protruding connectors 610 fewer than the number of the connectors 120 (e.g., two protruding connectors). In this case, two protruding connectors 610 may be connected to some of the connectors 120. The other two connectors 120 may remain uncoupled.

According to various embodiments of the present disclosure, the external device 600 may be a wireless charging cover. In the case where the electronic device 100 does not have a wireless charging function, the wireless charging cover may compensate for the lack of the wireless charging function. The wireless charging cover may include the protruding connector 610, a coil part 620, or a control part 630. The protruding connector 610 may perform physical or electrical connection to the electronic device 100. The coil part 620 may collect power wirelessly provided from an external power supply device. The control part 630 may provide the power collected by the coil part 620 to the inside of the electronic device 100 through the protruding connector 610 and the connector 120. For example, the protruding connector 610 may be electrically connected to a built-in battery of the electronic device 100 through the contact part 260 included in the connector 120. The built-in battery of the electronic device 100 may be charged with the power collected by the wireless charging cover.

In various embodiments of the present disclosure, in the case where a plurality of protruding connectors 610 exist, the control part 630 may determine the types and intensities of signal provided to the electronic device 100 through respective protruding connectors 610. For example, the control part 630 may transmit a power supply signal through a first protruding connector and may transmit a control signal through a second protruding connector.

Figure 7:
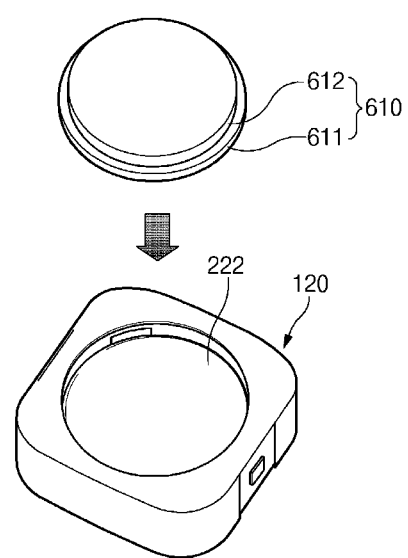
FIG. 7 is a perspective view illustrating connection between a protruding connector of an external device and a connector of an electronic device according to various embodiments of the present disclosure.

FIG. 7 is a perspective view illustrating connection between a protruding connector of an external device and a connector of an electronic device according to various embodiments of the present disclosure.

Referring to FIG. 7, the protruding connector 610 may have a stepped stack structure (e.g., a two-stage structure). In the case where the protruding connector 610 has a two-stage structure as illustrated in FIG. 7, the protruding connector 610 may include a first stage 611 and a second stage 612.

The first stage 611 may be connected to a surface of the external device 600 through the second stage 612. The first stage 611 may be inserted into the connector 120. The first stage 611 may have a larger area than that of the second stage 612. In various embodiments of the present disclosure, the first stage 611 may include a contact region. The contact region may be connected to the contact part 260 of the connector 120 so that power supply or electrical signals may be exchanged between them. Information on the contact region of the protruding connector 610 may be provided with reference to FIG. 8.

The second stage 612 may be disposed between the first stage 611 and a surface of the external device 600. The second stage 612 may serve to connect the first stage 611 to the surface of the external device 600 and support the first stage 611. When the protruding connector 610 is coupled to the connector 120, at least a part of the second stage 612 may be inserted into the connector 120, and another part of the second stage 612 may be fixed to the external device 600 at the outside of the connector 120.

Figure 8A:
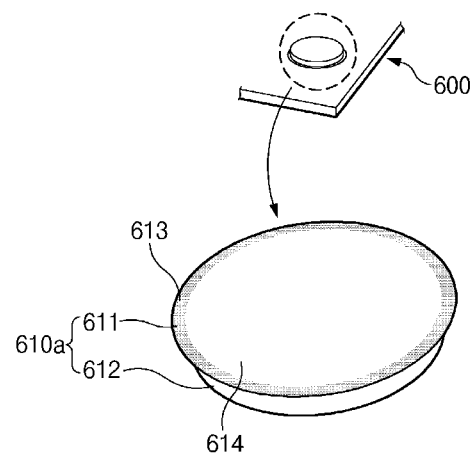
FIGS. 8A and 8B are perspective views illustrating a protruding connector according to various embodiments of the present disclosure.
Figure 8B:
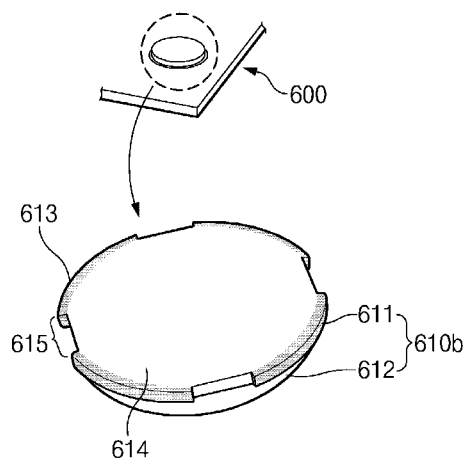

FIGS. 8A and 8B are perspective views illustrating a protruding connector according to various embodiments of the present disclosure.

FIGS. 8A and 8B exemplarily illustrate the protruding connector 610, but the protruding connector 610 is not limited thereto and may be variously modified.

FIG. 8A illustrates a protruding connector 610a according to a first embodiment of the present disclosure.

Referring to FIG. 8A, the protruding connector 610a may have a stepped stack structure (e.g., a two-stage structure). The protruding connector 601a may include a first stage 611 and a second stage 612. The first stage 611 may have a larger area than that of the second stage 612.

The first stage 611 may include a contact region 613 and a cross section 614. The contact region 613 may be disposed on an edge of the cross section 614 so as to be electrically connected to the contact part 260 of the connector 120. FIG. 8A exemplarily illustrates that the contact region 613 is disposed on an edge of the first stage 611, but the contact region 613 is not limited thereto and may be disposed on a side surface of the first stage 611 or a region in which the first stage 611 and the second stage 612 are connected to each other. In various embodiments of the present disclosure, the contact region 613 may include a plurality of contact pads. Each contact pad may be configured to transfer electric signals between the external device 600 and the electronic device 100. For example, the contact region 613 may include five contact pads respectively corresponding to pins of a micro USB. Each contact pad may be connected to the contact part 260 in the connector 120.

When being inserted into the connector 120, the cross section 614 may contact the top surface 222 of the plate 220. In various embodiments of the present disclosure, the cross section 614 may include an additional signal pad so as to be electrically connected to a signal pad disposed on the top surface 222. Information on the signal pads may be provided with reference to FIG. 13.

FIG. 8B illustrates a protruding connector 610b according to a second embodiment of the present disclosure.

Referring to FIG. 8B, the protruding connector 610b may have a stepped stack structure (e.g., a two-stage structure). The protruding connector 601b may include a first stage 611 and a second stage 612. The first stage 611 may have a larger area than that of the second stage 612. The first stage 611 may have a curved edge so as to be easily coupled to the connector 120.

The first stage 611 may include a contact region 613 and a cross section 614. The contact region 613 may be disposed on a curved edge region of the first stage 611. In various embodiments of the present disclosure, the contact region 613 may extend to a connection portion between the first stage 611 and the second stage 612.

According to various embodiments of the present disclosure, the first stage 611 may further include at least one guide connection part 615. In the case where the guide connection part 615 is inserted into the connector 120, the guide connection part 615 may be formed in a shape corresponding to the guide part 212 formed in the inner wall of the body part 210. For example, in the case where the guide part 212 is formed in the shape of a protrusion, the guide connection part 615 may be formed in the shape of a groove as illustrated in FIG. 8B. The protruding connector 610b may be guided by the guide connection part 615 to move in the connector 120.

Figure 9A:
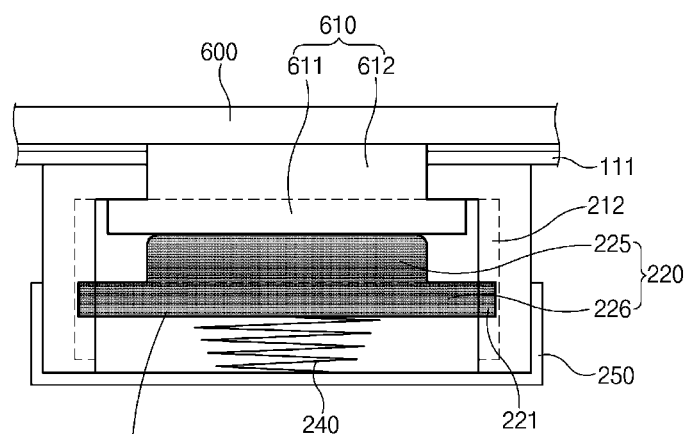
FIGS. 9A and 9B are cross sectional views illustrating connection between a protruding connector and a connector of an electronic device according to various embodiments of the present disclosure.
Figure 9B:
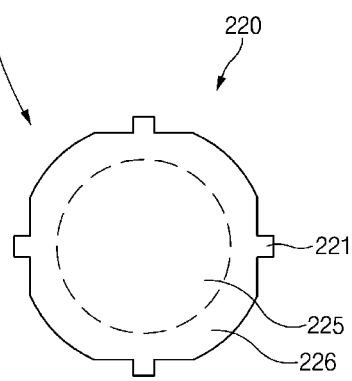

FIGS. 9A and 9B are cross sectional views illustrating connection between a protruding connector and a connector of an electronic device according to various embodiments of the present disclosure.

Referring to FIG. 9A, when the electronic device 100 is coupled to the external device 600, the protruding connector 610 may be inserted into the connector 120. The entirety of the first stage 611 of the protruding connector 610 may be inserted into the connector 120. The upper layer 225 of the plate 220 may contact the first stage 611 by virtue of the elastic force of the elastic part 240. The second stage 612 of the protruding connector 610 may connect the first stage 611 to a surface of the external device 600, and at least a part of the protruding connector 610 may be inserted into the connector 120.

The plate 220 may be moved towards the lower part of the body part 210 by virtue of a pressure generated due to insertion of the protruding connector 610. The plate 220 may be disposed while contacting the protruding connector 610 at a position where the pressure is balanced with the elastic force of the elastic part 240.

Referring to FIG. 9B, according to various embodiments of the present disclosure, the plate 220 may further include the guide connection part 221. The guide connection part 221 may allow the plate 220 to move along a designated route (e.g., vertically in the through-hole 211) corresponding to the guide part 212 formed in the inner wall of the body part 210. The guide connection part 221 may be changed in shape according to the shape of the guide part 212. In the case where the guide part 212 is formed in the shape of a groove (defined in the inner wall of the body part 210) as illustrated in FIG. 9, the guide connection part 221 may be formed in an opposite shape, i.e., a protrusion (projecting from the lower layer 226 towards the body part 210).

Figure 10A:
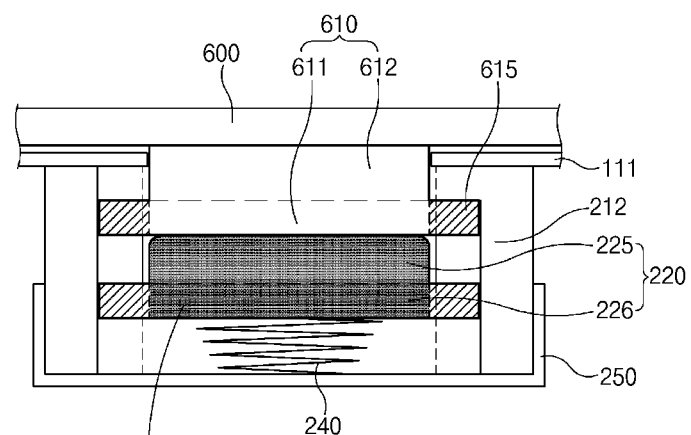
FIGS. 10A and 10B are cross sectional views illustrating connection of a connector in which a protruding guide is formed according to various embodiments of the present disclosure.
Figure 10B:
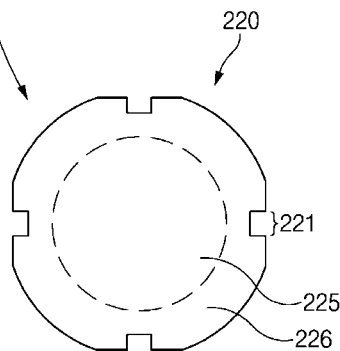

FIGS. 10A and 10B are cross sectional views illustrating connection of a connector in which a protruding guide is formed according to various embodiments of the present disclosure.

Referring to FIG. 10A, when the electronic device 100 is coupled to an external device 600, a protruding connector 610 may be inserted into the connector 120. The entirety of the first stage 611 of the protruding connector 610 may be inserted into the connector 120. The second stage 612 of the protruding connector 610 may connect the first stage 611 to a surface of the external device 600, and at least a part of the protruding connector 610 may be inserted into the connector 120. The plate 220 may be moved towards the lower part of the body part 210 by virtue of a pressure generated due to insertion of the protruding connector 610. The plate 220 may be disposed while contacting the protruding connector 610 at a position where the pressure is balanced with the elastic force of the elastic part 240.

The guide part 212 formed at the inner wall of the body part 210 may be shaped like a protrusion (projecting from the inner wall of the body part 210 towards the through-hole 240) as illustrated in FIG. 10. In this case, the guide connection part 221 may be formed in an opposite shape, i.e., a groove (defined in an edge of the lower layer 226).

Referring to FIG. 10B, according to various embodiments of the present disclosure, the first stage 611 of the protruding connector 610 may include the guide connection part 615. The guide connection part 615 may have a similar shape to that of the guide connection part 221 formed in the shape of a groove. The guide connection part 615 may be formed in the shape of a groove at an edge region of the first stage 611. The protruding connector 610 and the plate 220 may be stably moved vertically along the guide part 212.

Figure 11:
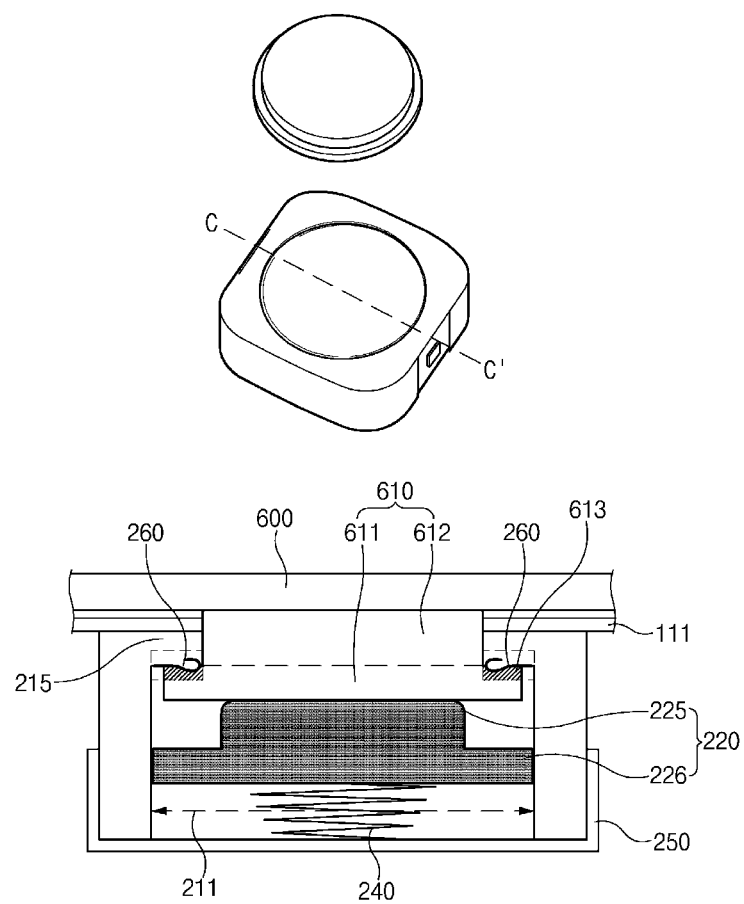
FIG. 11 is a cross sectional view of a connector including a contact part according to various embodiments of the present disclosure.

FIG. 11 is a cross sectional view of a connector including a contact part according to various embodiments of the present disclosure.

Referring to FIG. 11, when the electronic device 100 is coupled to the external device 600, the protruding connector 610 may be inserted into the connector 120. The entirety of the first stage 611 of the protruding connector 610 may be inserted into the connector 120. The plate 220 may be moved towards the lower part of the body part 210 by virtue of a pressure generated due to insertion of the protruding connector 610. The plate 220 may be disposed while contacting the protruding connector 610 at a position where the pressure is balanced with the elastic force of the elastic part 240.

According to various embodiments of the present disclosure, the connector 120 may include the contact part 260.

The contact part 260 may be disposed in the through-hole 211 in the body part 210. The contact part 260 may be electrically connected to the contact region 613 of the protruding connector 610. In various embodiments of the present disclosure, the contact part 260 may be formed on an inner wall of the barrier part 215 as illustrated in FIG. 11. In this case, the contact region 613 of the protruding connector 610 may be formed on an edge region of the first stage 611 or a connection region between the first stage 611 and the second stage 612. The contact part 260 may be formed of an elastic material so as to elastically react to a motion of the protruding connector 610.

According to various embodiments of the present disclosure, the contact part 260 may include a plurality of contact pads. Each contact pad may be configured to transfer designated electric signals between the external device 600 and the electronic device 100. For example, the contact part 260 may include five contact pads respectively corresponding to pins of a micro USB. The plurality of contact pads may be arranged on predetermined locations so as to be electrically connected to an external device.

Figure 12:
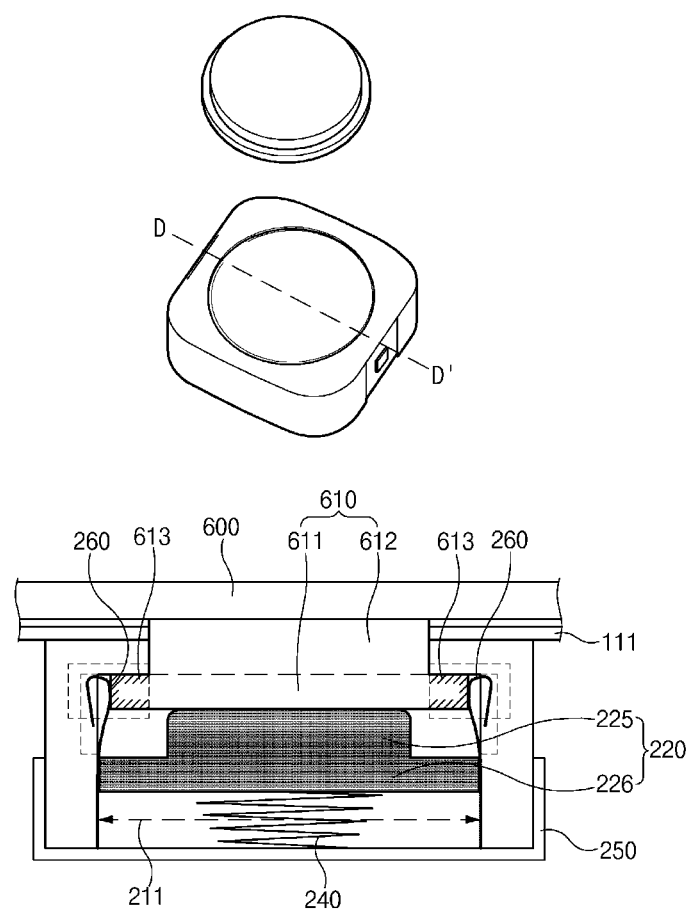
FIG. 12 is a cross sectional view of a connector including a contact part according to various embodiments of the present disclosure.

FIG. 12 is a cross sectional view of a connector including a contact part according to various embodiments of the present disclosure.

Referring to FIG. 12, when the electronic device 100 is coupled to the external device 600, the protruding connector 610 may be inserted into the connector 120. The entirety of the first stage 611 of the protruding connector 610 may be inserted into the connector 120. The plate 220 may be moved towards the lower part of the body part 210 by virtue of a pressure generated due to insertion of the protruding connector 610. The plate 220 may be disposed while contacting the protruding connector 610 at a position where the pressure is balanced with the elastic force of the elastic part 240.

According to various embodiments of the present disclosure, the contact part 260 may be adjacent to the inner wall of the body part 210 as illustrated in FIG. 12. In this case, the contact region 613 of the protruding connector 610 may be formed on an edge region of the first stage 611. In various embodiments of the present disclosure, the contact part 260 may be formed of an elastic material so as to elastically react to a motion of the protruding connector 610.

According to various embodiments of the present disclosure, the plate 220 may further include a groove (not shown) for preventing the plate 220 from overlapping the contact part 260. If the plate 220 overlaps the contact part 260 while moving in the body part 210, deformation due to abrasion may occur. Since the plate 220 includes the groove at an adjacent portion to the contact part 260, the plate 220 may be prevented from causing friction with the contact part 260 or being electrically connected thereto.

Figure 13:
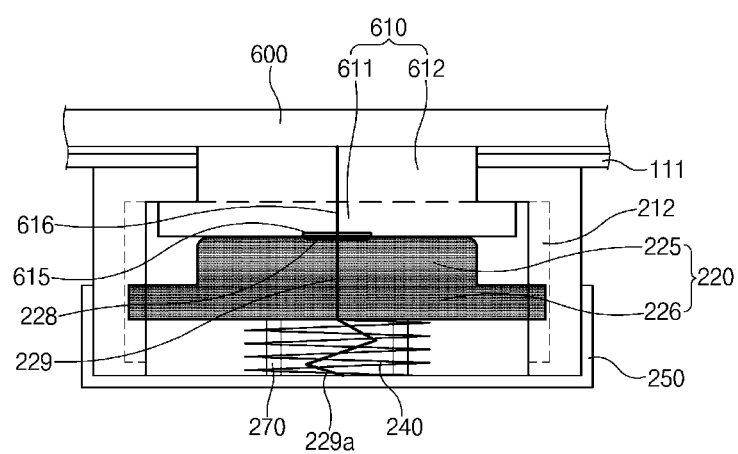
FIG. 13 is a cross sectional view illustrating connection of a connector including a pad on an interfacial surface between a plate and a protruding connector according to various embodiments of the present disclosure.

FIG. 13 is a cross sectional view illustrating connection of a connector including a pad on an interfacial surface between a plate and a protruding connector according to various embodiments of the present disclosure.

Referring to FIG. 13, the plate 220 may include a signal pad 228 and a signal line 229. The signal pad 228 may be disposed on a top surface of the plate 220. The signal line 229 may be connected to the signal pad 228 in the plate 220. The signal line 229 may pass through the plate 220 and the elastic part 240 so as to be connected to an internal circuit of the electronic device 100. In various embodiments of the present disclosure, a part 229a of the signal line 229 which passes through the elastic part 240 may be elastically adjusted in length in response to expansion and contraction of the elastic part 240.

According to various embodiments of the present disclosure, the protruding connector 610 may include a signal pad 615 and a signal line 616 corresponding to the signal pad 228 and the signal line 229. The signal pad 615 may be disposed on a cross section of the first stage 611. When the protruding connector 610 is inserted into the connector 120, the signal pad 615 may be electrically connected to the signal pad 228 disposed on the plate 220. The signal line 616 may be connected to the signal pad 615 in the protruding connector 610. The signal line 616 may connect an internal circuit of the external device 600 to the signal pad 615.

According to various embodiments of the present disclosure, the signal line formed in the connector 120 or the protruding connector 610 may be separate from the contact part 260 and may transmit/receive signals separately from the contact part 260. For example, in the case of using the wireless charging cover, the contact part 260 may transmit/receive a power signal collected through the wireless charging cover and the signal line may transmit/receive a signal for controlling power.

According to various embodiments of the present disclosure, the electronic device 100 and the external device 600 may mutually check an electric connection between them through the contact part 260, and then may transmit/receive signals through the signal pad 228 of the connector 120 and the signal pad 615 of the protruding connector 610.

In various embodiments of the present disclosure, the connector 120 may further include a block part 270 at the bottom of the plate 220. The block part 270 may prevent the plate 220 from descending to a height lower than a predetermined range. The block part 270 may determine a lower limit at which the plate 220 may arrive, so as to improve the stability of operation of the plate 220 or the elastic part 240. Furthermore, the block part 270 may protect the signal line 229a that passes through the elastic part 240.

Figure 14:
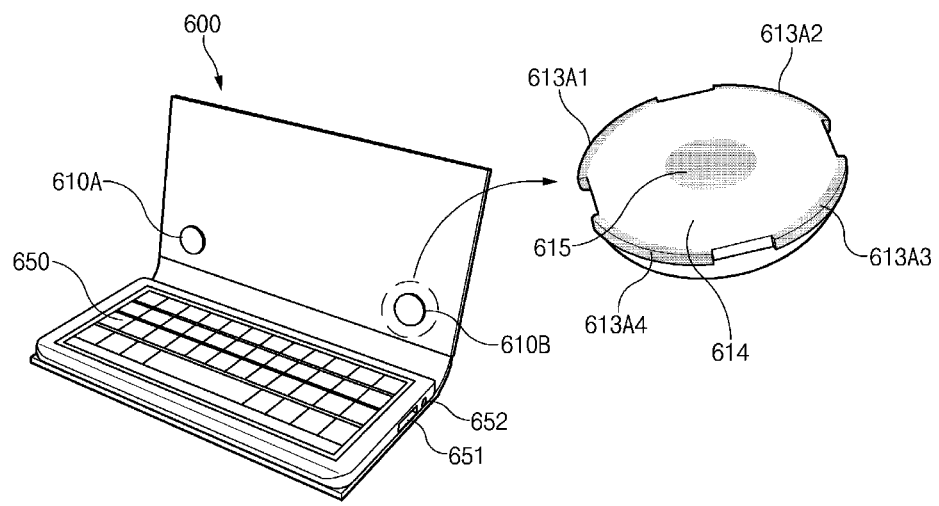
FIG. 14 is a perspective view of an external device according to various embodiments of the present disclosure.

FIG. 14 is a perspective view of an external device according to various embodiments of the present disclosure.

Referring to FIG. 14, the external device 600 may correspond to a keyboard device connectable to the electronic device 100. The external device 600 may include protruding connectors 610A and 610B and a keyboard module 650. FIG. 14 exemplarily illustrates that the external device 600 includes two protruding connectors 610A and 610B, but the external device 600 is not limited thereto, and a protruding connector may be added or removed in consideration of secure fixing or necessity of electric connection.

The keyboard module 650 may correspond to a device that converts a user input into an electric signal to provide the electric signal to the electronic device 100. The keyboard module 650 may be implemented with a physical key or a touchpad. Upon receiving an input from the user, the keyboard module 650 may convert the input into a corresponding electric signal. The electric signal may be provided to the electronic device 100 through the protruding connector 610A or 610B and the connector 120 corresponding to each protruding connector. The electronic device 100 may perform an operation in response to the electric signal. FIG. 14 exemplarily illustrates the keyboard module 650, but the external device 600 is not limited thereto. For example, a module for recognizing a motion of the user (e.g., a sensor device) or an interface module for receiving an input signal from the user (e.g., a voice recognition device) may be connected to the external device 600.

According to various embodiments of the present disclosure, the keyboard module 650 may include an external input/output terminal 651 or a power supply terminal 652. The external input/output terminal 651 may be a USB port or a micro USB port. The power supply terminal 652 may be connected to an external power supply device. The protruding connector 610A or 610B may provide, to the electronic device 100, a signal provided through the external input/output terminal 651 or the power supply terminal 652. For example, the protruding connector 610A may provide, to the electronic device 100, a keyboard signal generated due to an input from the user or a power supply signal received through the power supply terminal 652. The protruding connector 610B may provide, to the electronic device 100, an input/output signal received through the external input/output terminal 651.

According to various embodiments of the present disclosure, in the case where the external input/output terminal 651 is a USB port or a micro USB port, contact regions 613A1 to 613A2 or the signal pad 615 of the protruding connector 610B may be configured to correspond to respective pins of the USB port or the micro USB port. The contact regions 613A1 to 613A4 may respectively correspond to a 5V pin, a GND pin, a Data+ pin and a Data− pin, and the signal pad 615 may correspond to an ID pin. Signals corresponding to respective pins may be provided to the electronic device 100 through the signal pad 615 or the contact part 260 of the connector 120 corresponding to the signal pad or the contact regions.

Figure 15:
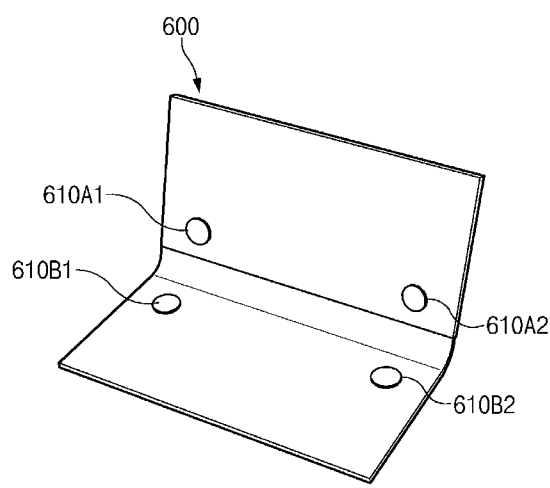
FIG. 15 is a perspective view of an external device including a plurality of protruding connectors according to various embodiments of the present disclosure.

FIG. 15 is a perspective view of an external device including a plurality of protruding connectors according to various embodiments of the present disclosure.

Referring to FIG. 15, the external device 600 may include a plurality of protruding connectors (e.g., 610A1, 610A2, 610B1 and 610B2). FIG. 15 illustrates that four protruding connectors are included, but the external device 600 is not limited thereto.

According to various embodiments of the present disclosure, the external device 600 may be connected to a plurality of electronic devices. In this case, some of the plurality of protruding connectors may be connected to a first electronic device, and the other protruding connectors may be connected to a second electronic device. For example, the protruding connectors 610A1 and 610A2 may be connected to the first electronic device (e.g., a device having a display such as a tablet), and the protruding connectors 610B1 and 610B2 may be connected to the second electronic device (e.g., a wireless communication device, a keyboard device, a game pad, or the like). The first and second electronic devices may be electrically connected to each other through the plurality of protruding connectors 610A1, 610A2, 610B1 and 610B2. For example, the protruding connectors 610A1 and 610B1 may be electrically connected to each other so as to transmit/receive power supply signals or control signals. Furthermore, the protruding connectors 610A2 and 610B2 may be electrically connected to each other so as to transmit/receive power supply signals or control signals.

Figure 16:
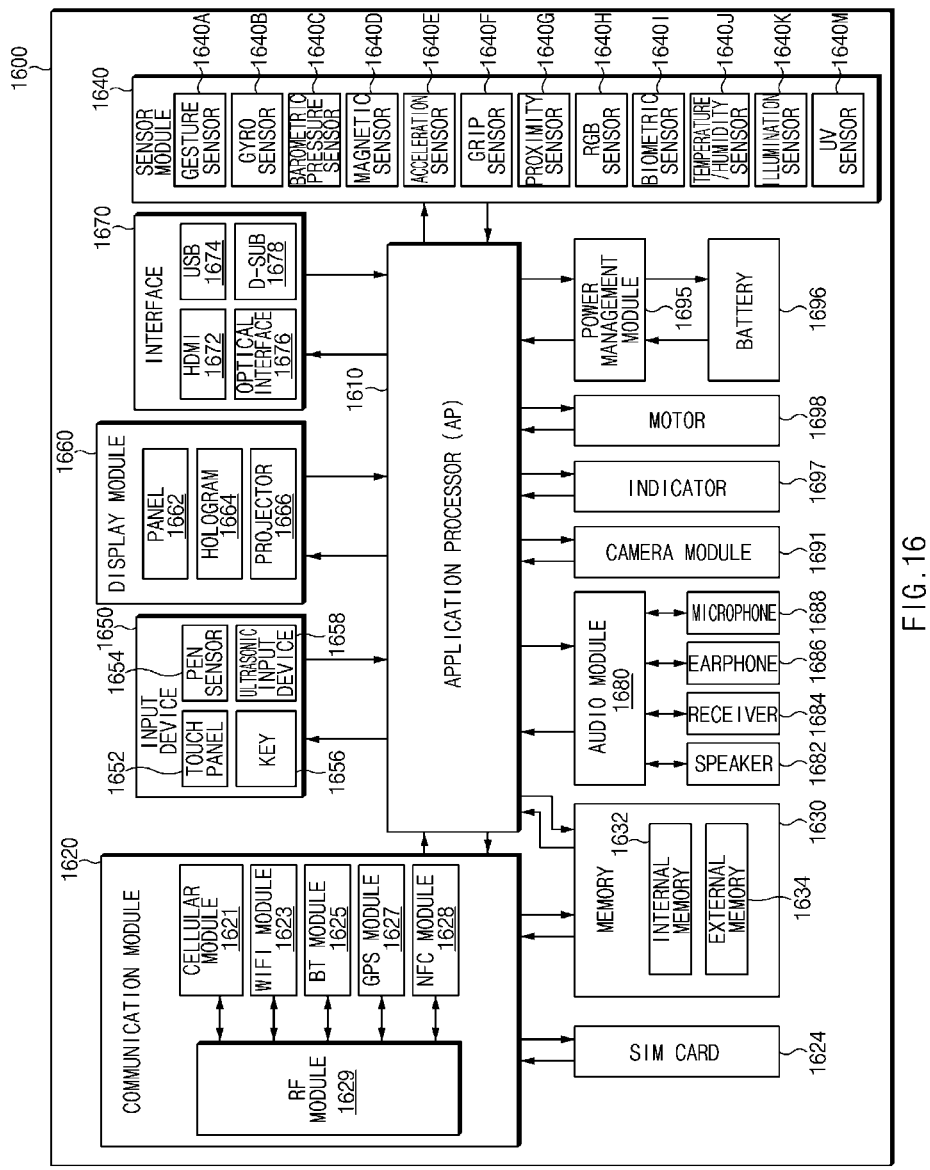
FIG. 16 is a block diagram illustrating an electronic device according to various embodiments of the present disclosure.

FIG. 16 is a block diagram illustrating an electronic device 1600 according to various embodiments of the present disclosure.

Referring to FIG. 16, the electronic device 1600 may include at least one application processor (AP) 1610, a communication module 1620, a subscriber identification module (SIM) card 1624, a memory 1630, a sensor module 1640, an input device 1650, a display 1660, an interface 1670, an audio module 1680, a camera module 1691, a power management module 1695, a battery 1696, an indicator 1697 and a motor 1698.

The AP 1610 may run an operating system or an application program so as to control a plurality of hardware or software elements connected to the AP 1610, and may process various data including multimedia data and may perform an operation thereon. The AP 1610 may be implemented with, for example, a system on chip (SoC). According to an embodiment of the present disclosure, the AP 1610 may further include a graphic processing unit (GPU) (not shown).

The communication module 1620 may perform data transmission/reception for communication between the electronic device 1601 and other electronic devices connected thereto through a network. According to an embodiment of the present disclosure, the communication module 1620 may include a cellular module 1621, a Wi-Fi module 1623, a BT module 1625, a GPS module 1627, an NFC module 1628, and a radio frequency (RF) module 1629.

The cellular module 1621 may provide a voice call service, a video call service, a text message service, or an Internet service through a telecommunications network (e.g., an LTE, LTE-A, CDMA, WCDMA, UMTS, WiBro or GSM network). Furthermore, the cellular module 1621 may identify and authenticate electronic devices in the telecommunications network using, for example, a subscriber identification module (e.g., the SIM card 1624). According to an embodiment of the present disclosure, the cellular module 1621 may perform at least a part of functions provided by the AP 1610. For example, the cellular module 1621 may perform at least a part of a multimedia control function.

According to an embodiment of the present disclosure, the cellular module 1621 may include a communication processor (CP). The cellular module 1621 may be implemented with, for example, an SoC. Although FIG. 16 illustrates that the cellular module 1621 (e.g., a communication processor), the memory 1630 and the power management module 1695 are separated from the AP 1610, the AP 1610 may include at least a part of the foregoing elements (e.g., the cellular module 1621), according to an embodiment of the present disclosure.

According to an embodiment of the present disclosure, the AP 1610 or the cellular module 1621 (e.g., a CP) may load, on a volatile memory, a command or data received from nonvolatile memories connected to the AP 1610 and the cellular module 1621 respectively or at least one of other elements, so as to process the command or data. Furthermore, the AP 1610 or the cellular module 1621 may store, in the nonvolatile memory, data received from or generated by at least one of the other elements.

Each of the Wi-Fi module 1623, the BT module 1625, the GPS module 1627 and the NFC module 1628 may include, for example, a processor for processing data transmitted/received through the modules. FIG. 16 illustrates that the cellular module 1621, the Wi-Fi module 1623, the BT module 1625, the GPS module 1627, and the NFC module 1628 are separate blocks. However, according to an embodiment of the present disclosure, at least a part (e.g., two or more) of the cellular module 1621, the Wi-Fi module 1623, the BT module 1625, the GPS module 1627, and the NFC module 1628 may be included in a single integrated chip (IC) or IC package. For example, at least a part (e.g., a communication processor corresponding to the cellular module 1621 and a Wi-Fi processor corresponding to the Wi-Fi module 1623) of the cellular module 1621, the Wi-Fi module 1623, the BT module 1625, the GPS module 1627 and the NFC module 1628 may be implemented with a single SoC.

The RF module 1629 may transmit/receive data, for example, may transmit/receive RF signals. Although not illustrated, for example, a transceiver, a power amp module (PAM), a frequency filter or a low noise amplifier (LNA) may be included in the RF module 1629. Furthermore, the RF module 1629 may further include a component such as a conductor or a wire for transmitting/receiving free-space electromagnetic waves in a wireless communication system. FIG. 16 illustrates that the cellular module 1621, the Wi-Fi module 1623, the BT module 1625, the GPS module 1627, and the NFC module 1628 share the single RF module 1629. However, according to an embodiment of the present disclosure, at least one of the cellular module 1621, the Wi-Fi module 1623, the BT module 1625, the GPS module 1627, or the NFC module 1628 may transmit/receive RF signals through an additional RF module.

The SIM card 1624 may include a subscriber identification module, and may be inserted into a slot formed at a specific location of the electronic device. The SIM card 1624 may include unique identification information (e.g., an integrated circuit card identifier (ICCID)) or subscriber information (e.g., international mobile subscriber identity (IMSI)).

The memory 1630 may include an internal memory 1632 or an external memory 1634. The internal memory 1632 may include at least one of a volatile memory (e.g., a dynamic RAM (DRAM), a static RAM (SRAM) or a synchronous dynamic RAM (SDRAM)) or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present disclosure, the internal memory 1632 may be a solid state drive (SSD). The external memory 1634 may include a flash drive, for example, compact flash (CF), secure digital (SD), micro secure digital (Micro-SD), mini secure digital (Mini-SD), extreme digital (xD) or a memory stick. The external memory 1634 may be functionally connected to the electronic device 1601 through various interfaces. According to an embodiment of the present disclosure, the electronic device 1601 may further include a storage device (or a storage medium) such as a hard drive.

The sensor module 1640 may measure physical quantity or detect an operation state of the electronic device 1601 so as to convert measured or detected information into an electrical signal. The sensor module 1640 may include, for example, at least one of a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor 1640H (e.g., a red/green/blue (RGB) sensor), a biometric sensor 1640I, a temperature/humidity sensor 1640J, an illumination sensor 1640K, or an ultraviolet (UV) sensor 1640M. Additionally or alternatively, the sensor module 1640 may include, for example, (not shown) an olfactory sensor (E-nose sensor), an electromyography (EMG) sensor, an electroencephalogram (EEG) sensor, an electrocardiogram (ECG) sensor, an infrared (IR) sensor, an iris recognition sensor, or a fingerprint sensor. The sensor module 1640 may further include a control circuit for controlling at least one sensor included therein.

The input device 1650 may include a touch panel 1652, a (digital) pen sensor 1654, a key 1656, or an ultrasonic input device 1658. The touch panel 1652 may recognize a touch input using at least one of capacitive, resistive, infrared, and ultraviolet sensing methods. The touch panel 1652 may further include a control circuit. In the case of using the capacitive sensing method, a physical contact recognition or proximity recognition is allowed. The touch panel 1652 may further include a tactile layer. In this case, the touch panel 1652 may provide tactile reaction to a user.

The (digital) pen sensor 1654 may be implemented in a similar or same manner as that for receiving a touch input of a user, or may be implemented using an additional sheet for recognition. The key 1656 may include, for example, a physical button, an optical button, or a keypad. The ultrasonic input device 1658, which is an input device for generating an ultrasonic signal, may enable the electronic device 1601 to sense a sound wave through a microphone (e.g., a microphone 1688) so as to identify data, wherein the ultrasonic input device 1658 is capable of wireless recognition. According to an embodiment of the present disclosure, the electronic device 1601 may use the communication module 1620 so as to receive a user input from an external electronic device (e.g., a computer or server) connected to the communication module 1620.

The display 1660 may include a panel 1662, a hologram device 1664, or a projector 1666. The panel 1662 may be, for example, a liquid crystal display (LCD) or an active-matrix organic light-emitting diode (AM-OLED). The panel 1662 may be rendered, for example, flexible, transparent or wearable. The panel 1662 and the touch panel 1652 may be integrated into a single module. The hologram device 1664 may display a stereoscopic image in a space using a light interference phenomenon. The projector 1666 may project light onto a screen so as to display an image. The screen may be disposed in the inside or the outside of the electronic device 1601. According to an embodiment of the present disclosure, the display 1660 may further include a control circuit for controlling the panel 1662, the hologram device 1664, or the projector 1666.

The interface 1670 may include, for example, a high definition multimedia interface (HDMI) 1672, a universal serial bus (USB) 1674, an optical interface 1676, or a D-subminiature (D-sub) 1678. Additionally or alternatively, the interface 1670 may include, for example, a mobile high-definition link (MHL) interface, a secure digital (SD) card/multi-media card (MMC) interface, or an infrared data association (IrDA) interface.

The audio module 1680 may convert a sound into an electrical signal or vice versa. The audio module 1680 may process sound information input or output through a speaker 1682, a receiver 1684, an earphone 1686, or the microphone 1688.

According to an embodiment of the present disclosure, the camera module 1691 for shooting a still image or a video may include at least one image sensor (e.g., a front sensor or a rear sensor), a lens (not shown), an image signal processor (ISP) (not shown), or a flash (e.g., an LED or a xenon lamp) (not shown).

The power management module 1695 may manage power of the electronic device 1601. Although not illustrated, a power management integrated circuit (PMIC), a charger integrated circuit (IC), or a battery or fuel gauge may be included in the power management module 1695.

The PMIC may be mounted on an integrated circuit or an SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, or a rectifier.

The battery gauge may measure, for example, a remaining capacity of the battery 1696 and a voltage, current or temperature thereof while the battery is charged. The battery 1696 may store or generate electricity, and may supply power to the electronic device 1601 using the stored or generated electricity. The battery 1696 may include, for example, a rechargeable battery or a solar battery.

The indicator 1697 may display a specific state of the electronic device 1601 or a part thereof (e.g., the AP 1610), such as a booting state, a message state, or a charging state. The motor 1698 may convert an electrical signal into a mechanical vibration. Although not illustrated, a processing device (e.g., a GPU) for supporting a mobile TV may be included in the electronic device 1601. The processing device for supporting a mobile TV may process media data according to the standards of digital multimedia broadcasting (DMB), digital video broadcasting (DVB) or media flow.

According to various embodiments of the present disclosure, an electronic device may include a case part connectable to an external device, the case part covering the electronic device, the case part having at least one hole, and a connector, at least a part of which is exposed through the hole so as to perform electrical or physical connection to the external device. The exposed part may form a smooth surface with a surface of the case part. The connector may be fixed to at least one of surfaces of a board, a bracket, a housing or a hardware component in the electronic device so as to be electrically connected thereto. The connector may be coupled to a protruding connector connected to the external device. The exposed part may have the same texture or color as that of the surface of the case part.

According to various embodiments of the present disclosure, the connector may include a body part having a through-hole, a plate movable in the through-hole, and an elastic part for supporting the plate. The plate may have a stepped structure, wherein a first stage disposed at a lower layer of the stepped structure may have a wider cross section than that of a second stage disposed at an upper layer of the stepped structure. At least a part of the second stage may be exposed to the outside through the hole.

According to various embodiments of the present disclosure, the body part may include a guide part at an inner wall thereof, wherein the plate may include a guide connection part coupled to the guide part so as to be moved. The guide part may be formed in the shape of a protrusion or a groove at the inner wall of the body part.

According to various embodiments of the present disclosure, the connector may further include a contact part adjacent to an inner wall of the through-hole, wherein the contact part may be exposed to the outside due to movement of the plate. The contact part may include at least one contact pad, wherein the contact pad may transmit/receive a designated electric signal. The contact part may be formed of an elastic material.

According to various embodiments of the present disclosure, the plate may further include a pad electrically connectable to the external device. The plate may define a groove in a region adjacent to the body part or the contact part formed on the body part along a route of the movement.

According to various embodiments of the present disclosure, the connector may further include a block part for restricting the movement of the plate within a designated range. The connector may further include a fixing part connected to an exterior of the body part so as to be fixed to the electronic device. The fixing part may include a connection device connected to the exterior of the body part to exchange electric signals with the electronic device. The connection device may include a signal pad, a clip pad, or a connector terminal. The connector may further include a base part for supporting the elastic part. The base part may further include a coupling part joinable to the body part.

According to various embodiments of the present disclosure, a device may include a protruding connector in order to be electrically or physically connected to an electronic device, wherein the protruding connector may have a stepped structure, wherein a first stage of the stepped structure may be inserted into the electronic device and a second stage of the stepped structure may support the first stage. The first stage may have a wider cross section than that of the second stage, and may be inserted into the electronic device so as to be coupled thereto. The first stage may include a contact region electrically connectable to the electronic device. The device may electrically connect a plurality of electronic devices to each other.

According to various embodiments of the present disclosure, a method for coupling an external device to an electronic device may include pressing a plate of a connector included in the electronic device by a protruding connector connected to the external device, coupling a part of the protruding connector to a body part of the connector by inserting the part of the protruding connector into the body part of the connector due to movement of the plate, and electrically connecting a contact region formed on the part of the protruding connector to a contact part exposed due to the movement of the plate. The coupling may include coupling the part of the protruding connector to the connector.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific integrated circuit (ASIC) chip, a field-programmable gate array (FPGA), or a programmable-logic device for performing some operations, which are known or will be developed.

According to various embodiments of the present disclosure, at least a part of devices (e.g., modules or functions thereof) or methods (e.g., operations) according to the present disclosure may be implemented as instructions stored in a computer-readable storage medium in the form of a programming module. In the case where the instructions are performed by at least one processor (e.g., the processor 1610), the at least one processor may perform functions corresponding to the instructions. The computer-readable storage medium may be, for example, the memory 1630. At least a part of the programming module may be implemented (e.g., executed) by the processor 1610. At least a part of the programming module may include, for example, a module, program, routine, sets of instructions, or process for performing at least one function.

The computer-readable storage medium may include a magnetic medium such as a hard disk, a floppy disk and a magnetic tape, an optical medium such as a compact disk read only memory (CD-ROM) and a digital versatile disc (DVD), a magneto-optical medium such as a floptical disk, and a hardware device configured to store and execute program instructions (e.g., programming module), such as a read only memory (RAM), a random access memory (RAM) and a flash memory. The program instructions may include machine language codes made by compilers and high-level language codes that can be executed by computers using interpreters. The above-mentioned hardware may be configured to be operated as one or more software modules for performing operations of the present disclosure and vice versa.

The module or programming module according to the present disclosure may include at least one of the above-mentioned elements, or some elements may be omitted or other additional elements may be added. Operations performed by the module, the programming module or the other elements may be performed in a sequential, parallel, iterative or heuristic way. Furthermore, some operations may be performed in another order or may be omitted, or other operations may be added.

As described above, various embodiments of the present disclosure include an integrated connector for electrically or physically connecting an electronic device to an external device so as to improve the efficiency of device connection.

According to various embodiments of the present disclosure, the size of an electronic device or an external device may be reduced by virtue of an integrated connector, and simple design may be achieved.

According to various embodiments of the present disclosure, the stability of device connection may be improved using a connector including an elastic material.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device connectable to an external device, the electronic device comprising:
    a case part configured to cover the electronic device, the case part having at least one hole;
    a connector, at least a part of which is exposed through the hole so as to perform electrical or physical connection to the external device; and
    a barrier part arranged on a surface of the case part so as to prevent the exposed part from protruding beyond the surface of the case part,
    wherein the exposed part forms a smooth surface with the surface of the case part.

2. The electronic device according to claim 1, wherein the connector is fixed to at least one of surfaces of a board, a bracket, a housing and a hardware component in the electronic device so as to be electrically connected thereto.

3. The electronic device according to claim 1, wherein the connector is coupled to a protruding connector connected to the external device.

4. The electronic device according to claim 1, wherein the exposed part has the same texture or color as that of the surface of the case part.

5. The electronic device according to claim 1, wherein the connector comprises:
    a body part having a through-hole;
    a plate movable in the through-hole; and
    an elastic part configured to support the plate.

6. The electronic device according to claim 5, wherein the plate has a stepped structure, wherein a first stage disposed at a lower layer of the stepped structure has a wider cross section than that of a second stage disposed at an upper layer of the stepped structure.

7. The electronic device according to claim 6, wherein at least a part of the second stage is exposed to the outside through the hole.

8. The electronic device according to claim 5, wherein the body part comprises a guide part at an inner wall thereof, wherein the plate comprises a guide connection part coupled to the guide part so as to be moved.

9. The electronic device according to claim 8, wherein the guide part is formed in a shape of a protrusion or a groove at the inner wall of the body part.

10. The electronic device according to claim 5, wherein the connector further comprises a contact part adjacent to an inner wall of the through-hole, wherein the contact part is exposed to the outside due to movement of the plate.

11. The electronic device according to claim 10, wherein the contact part comprises at least one contact pad, wherein the contact pad transmits/receives a designated electric signal.

12. The electronic device according to claim 10, wherein the contact part is formed of an elastic material.

13. The electronic device according to claim 5, wherein the plate comprises a pad electrically connectable to the external device.

14. The electronic device according to claim 5, wherein the plate defines a groove in a region adjacent to the body part or the contact part formed on the body part, along a route of the movement.

15. The electronic device according to claim 5, wherein the connector further comprises a fixing part connected to an exterior of the body part so as to be fixed to the electronic device.

16. The electronic device according to claim 15, wherein the fixing part comprises a connection device connected to the exterior of the body part to exchange electric signals with the electronic device.

17. The electronic device according to claim 16, wherein the connection device comprises a signal pad, a clip pad, or a connector terminal.

18. The electronic device according to claim 5, wherein the connector further comprises a base part configured to support the elastic part.

19. The electronic device according to claim 18, wherein the base part further comprises a coupling part joinable to the body part.

20. A device comprising:
    a protruding connector configured to be electrically or physically connected to an electronic device, the protruding connector having a stepped structure, wherein a first stage of the stepped structure is inserted into the electronic device and a second stage of the stepped structure supports the first stage.

21. The device according to claim 20, wherein the first stage has a wider cross section than that of the second stage, and is inserted into the electronic device so as to be coupled thereto.

22. The device according to claim 20, wherein the first stage comprises a contact region electrically connectable to the electronic device.

23. The device according to claim 20, wherein the device is configured to electrically connect a plurality of electronic devices to each other.

* * * * *